Dec. 28, 1943.      F. HANSGIRG      2,337,551
PROCESS OF PRODUCING GAS MIXTURES FOR SYNTHETIC PURPOSES
Filed July 27, 1940
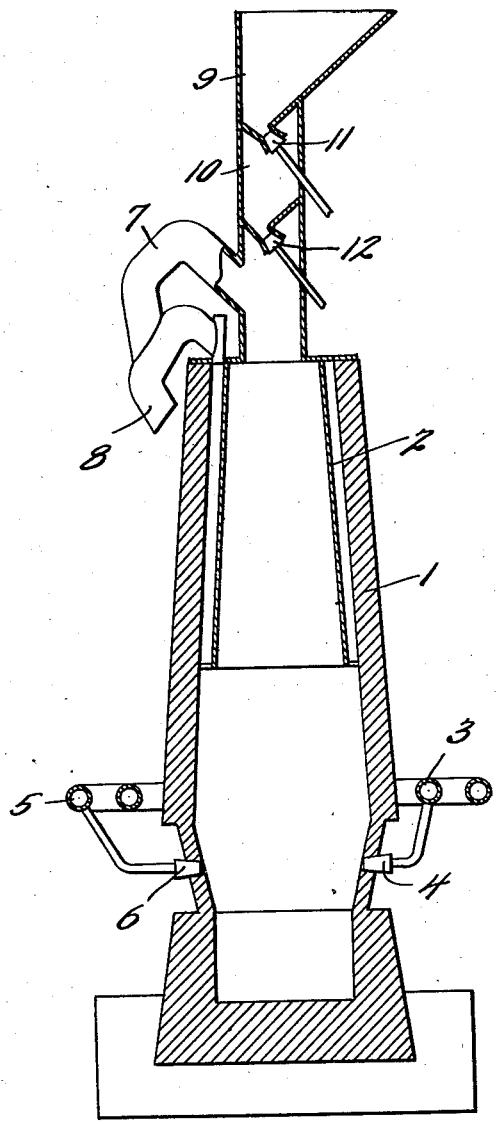

Patented Dec. 28, 1943

2,337,551

UNITED STATES PATENT OFFICE 2,337,551

PROCESS OF PRODUCING GAS MIXTURES FOR SYNTHETIC PURPOSES

Fritz Hansgirg, Hoshigaura-Dairen, Kwantung, Manchoukuo; vested in the Alien Property Custodian Application July 27, 1940, Serial No. 348,505 In Japan May 13, 1938

5 Claims. (Cl. 75—41)

This invention relates to a process of producing a gas mixture suitable for synthetic purposes.

The present invention consists principally in a method of using a gas mixture as blast gas in metallurgical and other processes, wherein oxygen is mixed with industrial gases poor in nitrogen, for example, coke-oven gas or natural gas, in order to produce in the furnace a gas mixture consisting mainly of hydrogen and carbon monoxide or hydrogen and nitrogen, in a ratio suitable for synthetic purposes. Special means are provided for adapting the iron blast furnace to the purpose of this invention.

This application is a continuation-in-part of my application Serial No. 271,804, filed May 4, 1939.

Synthetic processes employing gas are daily becoming more and more of importance as huge amounts of heavy chemicals are produced by such processes. For instance, in the fertilizer industry large amounts of hydrogen-nitrogen mixtures are employed. This is also the case in the synthetic production of methanol, gasoline, light and heavy oils and the hydrogenation of coal, in which large amounts of hydrogen or hydrogen-carbon-monoxide mixture are used. The classical method for the large scale production of such mixtures consists in producing water gas from coke or coal and subsequently converting the carbon monoxide component into $CO_2$ and $H_2$ by using steam as an oxidant over catalysts. After removing the $CO_2$ there remains a mixture which contains the necessary components, $H_2$ and $CO$, in the necessary ratio for the process in question. For ammonia synthesis, the carbon monoxide is fully converted and removed, later adding the necessary nitrogen or converting a water gas-producer gas mixture in such ratio that after removing the $CO_2$ the right ratio of $H_2$ to $N_2$ for ammonia synthesis is obtained. In all such processes, coal or coke is used to produce the desired gas mixture, which causes the principal cost in the preparation of such gases.

According to the present invention, industrial gases poor in nitrogen which are by-products of chemical processes, are used together with oxygen as blast gases in metallurgical reduction processes, and gas mixtures suitable for synthetic use are recovered from such operations. As industrial gases, for example, there may be used the methane-rich waste gases from oil synthesis and coal hydrogenation processes, and also natural gas and coke oven gas. All such gases are poor in nitrogen.

In all reduction processes in metallurgy (except electrical processes) the ores to be reduced are mixed with a carbonaceous material such as coal, charcoal or coke, and air is blown in in such mixtures that the carbonaceous material is partly oxidized, and by the heat generated the reduction temperature is reached and the remaining carbonaceous material is used as a reducing agent. Typical examples are the iron blast furnace process and the copper and lead smelters. As the temperature of reduction in all such processes is very high, the oxidation of the carbon introduced proceeds mostly only as far as to produce carbon monoxide, as carbon dioxide cannot exist according to equilibrium conditions at the temperature of reduction in the presence of carbon. Therefore, all such processes would produce a gas rich in carbon monoxide. But in using air as a blast the carbon monoxide produced is greatly diluted with nitrogen, and even if the gas is later used for ammonia synthesis, the concentration of nitrogen in such furnaces is so high that because of the chemical inertness of nitrogen its removal is complicated and expensive.

Therefore, it has been proposed to use, instead of air, oxygen or mixtures rich in oxygen as blast gas in metallurgical reduction processes. But, by using oxygen in higher concentrations (as compared with air) there occur considerable alterations of the conditions in the already fully-developed processes, so that without considerably changing the equipment, oxygen in higher concentrations cannot be used as a blast. It has also been proposed to employ oxygen-steam mixtures, for example, for the iron blast furnace, but this method causes the production of water gas with consequent increase in the coal or coke consumption. If oxygen is used as a blast in a metallurgical reduction process, mainly carbon monoxide is developed. If hydrogen is necessary in the gas mixture for synthesis purposes, it can only be produced by the additional partial conversion of the carbon monoxide with steam, which again causes a loss of carbon, as a part of the $CO$ converted must be removed as carbon dioxide.

However, to produce hydrogen it is not necessary to have water gas as the source. There exist in industry large amounts of waste gases like coke-oven gas, natural gases, and waste gases from the coal hydrogenation and oil synthesis processes. They all contain a considerable amount of hydrogen together with methane, say between 20% and 95%.

Industry therefore has developed many processes for converting the methane into hydrogen and carbon monoxide by cracking or oxidation with steam over catalysts, or conducting such methane-containing gases over water gas producers mixed with steam. All such processes have the disadvantage of requiring a special equipment which uses coal or coke for the cracking of the methane.

It has also been proposed to separate the constituents of coke-oven gas by liquefaction and fractional distillation to produce hydrogen and carbon monoxide-methane mixtures.

To overcome all the above described difficulties and to produce a gas-mixture suitable for synthetic purposes, according to the present invention the decomposition of the methane is effected by employing methane-containing waste gases together with oxygen as the blast gas in a metallurgical reduction process.

The reactions in question occur as follows: If such a gas mixture is introduced, for example, into the hearth zone of an iron blast furnace, at least at a temperature of 1500°–1600° C. the methane decomposes into C and $2H_2$. The elementary C is oxidized by the oxygen and produces part of the necessary caloric energy for maintaining the reduction temperature. The carbonaceous material, for example coke, admixed with the ore for the reduction and also for the maintenance of the reaction temperature will react directly or indirectly according to the well-known reaction in the shaft of an iron blast furnace. The hydrogen present cannot be oxidized into steam, as in contact with carbon the steam must react immediately forming CO and $H_2$. Therefore, under equilibrium conditions in the hearth zone only elementary C, carbon monoxide and hydrogen can coexist.

In the iron blast furnace of the ordinary type, the reduction of the ores occurs at the temperature zone of 600° C. in the shaft by pure gas reaction. In this zone, according to Boudouards' equilibrium the reduction of the ores produces carbon dioxide, so that in the pre-reduction zone carbon dioxide also is produced.

If instead of normal air a blast is used consisting of coke-oven gas and oxygen in a ratio 4:1, in such blast the nitrogen of the air is replaced by coke-oven gas. If the coke-oven gas were a fully neutral inert gas like nitrogen, the equilibrium of heat would remain unchanged. However, the decomposition of the methane content of the coke-oven gas uses some heat. To compensate this heat loss, it is necessary to use oxygen in a higher ratio to the coke-oven gas, which reduces the volume of gas passing through the shaft of the furnace and consequently reduces the sensible heat. If oxygen of a greater volume than that corresponding to the ratio of oxygen in air is used, the heat economy may be improved so much that the energy necessary for the decomposition of methane can be easily compensated. Furthermore, by reason of the higher temperature generated in the hearth by the use of oxygen in the higher concentration, it becomes unnecessary to preheat the blast to such an extent as is necessary in case of air.

In order to recover a gas poor in carbon dioxide, a part of the gas is discharged from the shaft of the blast furnace at a temperature zone where the equilibrium according to the equation $$2CO = C + CO_2$$

is practically on the side of CO (that is around 1000° C.). A part of the gas is discharged usually from the top of the furnace. If the whole amount of the gas produced is required for synthetic purposes, the gas discharged from the top of the shaft may be circulated again to the hearth. In such case, the carbon dioxide contained in this part of the gas reacts with the carbon present in the hearth and forms CO. The reduction of the ore becomes entirely direct, which means that the whole carbon introduced into the furnace for reduction purposes is oxidized into CO. This means an increased amount of C for reduction which is counteracted by the reduced gas volume, and the greater heat economy when a high proportion of oxygen is used. In this case, all the gases generated by the furnace may be used for synthetic purposes. But in the ordinary operation with a blast furnace a part of the gas is used for heating purposes, and it is generally economical and advantageous to employ for heating purposes only that part of the gas discharged at the top of the furnace, the other part discharged at higher temperatures being used for synthetic purposes.

By the above-stated method it is possible to adjust the ratio of hydrogen to carbon monoxide within a considerable range. The variable factors for this adjustment are the ratio of oxygen to coke-oven gas introduced into the hearth, the ratio of the amount of gas discharged at a high temperature and at the top of the shaft, and finally the amount of the shaft-top gas recycled into the hearth of the furnace. The following practical example shows these conditions:

In the average operation of an iron blast furnace, per ton iron to be produced, 3,000 m.³ of air is blown in and 4,000 m.³ of oven gas is released from the top. The analysis of the oven gas is:

| | Volume per cent |
|---|---|
| $CO_2$ | 8–10 |
| CO | 28–30 |
| $O_2$ | 0–3 |
| $H_2$ | 1–2 |
| $N_2$ | 57–61 |

The ratio of $CO_2$ to CO in the oven gas shows the ratio of indirect reduction to direct reduction which is going on in the shaft, at a temperature between 1,000° C. and 300° C.

If 3,000 m.³ of air per ton of pig iron is blown into the furnace, 2,375 m.³ of nitrogen and 625 m.³ of oxygen are introduced into the furnace.

According to the process of the invention, the 2,375 m.³ of nitrogen should be replaced by coke-oven gas of the following average composition:

| | Volume per cent |
|---|---|
| $CO_2$ | 3 |
| CO | 10 |
| $O_2$ | 1 |
| $H_2$ | 50 |
| $CH_4$ | 28 |
| $C_nH_{2N}$ | 2 |
| $N_2$ | 6 |

If such gas were blown in simultaneously with 625 m.³ of oxygen, the $CH_4$ would decompose and produce one volume of CO and two volumes of $H_2$. But for forming the CO a great part of the oxygen would be used up, and thus there would be not enough oxygen left to burn the coke present in the charge. This would result in too low a temperature in the hearth. For compensating this heat loss and to maintain the normal conditions of operation the relative amount of the blast per ton of iron produced must be changed. A thermal calculation of the heat equilibrium in the iron blast furnace gives the result that, per ton of pig iron produced, instead of 625 m.³ oxygen and 2,375 m.³ of nitrogen in the air blast, 778 m.³ of oxygen and 1,700 m.³ of coke-oven gas must be used. Such a mixture produces a temperature equilibrium equal to the normal operation with air blast.

If both gases are introduced at the above ratio and the gas is discharged at a temperature between 700° and 1,000° C., 4,600 m.³ leave the furnace with the following composition:

*Example I*

| | Volume per cent |
|---|---|
| $CO_2$ | 2.7 |
| $CO$ | 53.3 |
| $H_2$ | 41.7 |
| $N_2$ | 2.3 |

If the gas is normally discharged from the top of the furnace, a part of the CO is transformed into $CO_2$. According to the experience in the electric iron shaft furnace, the ratio of $CO_2$ to CO becomes 0.5 due to the higher concentration of reducing gases in the shaft. Under such conditions, 4,050 m.³ of gas leave the furnace with the following composition:

*Example II*

| | Volume per cent |
|---|---|
| $CO_2$ | 16.7 |
| $CO$ | 33.4 |
| $H_2$ | 47.4 |
| $N_2$ | 2.5 |

In the first case, the ratio of CO to $H_2$ is 1 to 0.78, while in the second case it is 1 to 1.4.

In the normal operation of the iron blast furnace, about one ton of coke is necessary per ton of pig iron produced. In the example according to the present invention, by reason of the C-combustion in the reduction of the methane in the coke-oven gas the coke ratio per ton of pig iron is reduced to 720 kg.

This example is calculated to maintain the normal condition in the iron blast furnace using the oxygen-coke-oven gas blast, except that the proportion of coke used is considerably reduced. To increase the ratio of CO and $H_2$ beyond 1 to 1.4, some steam may be blown in. Under such conditions, of course, the ratio of the coke, coke-oven-gas and oxygen per ton of pig iron produced must be increased.

A similar calculation can be made for the copper or lead smelter in order to use in this equipment, instead of air, oxygen and a gas poor in nitrogen as a blast, such mixture to be introduced in such a ratio that the thermal equilibrium in the smelter remains unchanged as compared with the use of normal air blast. In this case, also, a gas may be produced which consists mainly of carbon monoxide and hydrogen, and is poor in nitrogen, so that it can be used for synthetic purposes.

As the practice with respect to the copper and lead smelter varies considerably on account of the great difference in the composition of the ores to be reduced, it is not possible to give a general example as in the case of the iron blast furnace, but any person skilled in the art will be able to ascertain the right ratio between oxygen and the other gas applied, to keep normal conditions of operation, the only difference being that by operating according to the invention, the shaft-top gas of the smelter is suitable for synthetic purposes.

The accompanying drawing illustrates the arrangement of an iron blast furnace to carry out this process. The numeral 1 indicates the body of a conventional shaft furnace, having an inserted body 2 in which the ore and coke mixture is charged. Between the furnace wall and the inserted body 2 an annular space is formed through which the gas can escape without passing through the raw material column inside the body 2. The annular conduit 3 distributes oxygen through the nozzles 4, and the annular conduit 5 and nozzles 6 supply coke-oven gas or any other industrial gas mentioned before. There may be a plurality of nozzles connected with conduit 3 and another plurality of nozzles connected with conduit 5, arranged on the circumference of the lower part of the shaft furnace, the oxygen nozzles and the coke-oven gas nozzles alternating so that the gases blown in will mix inside the furnace. The raw material containing ore and coke and fluxing material is charged into the furnace through the lock chambers 9 and 10, and automatic valves 11 and 12 open alternately so that the raw material can be charged without escape of furnace gas. For the oven gases there are provided two discharge pipes 7 and 8, and by valves controlling these pipes it is possible to discharge the furnace gases entirely through 7 or entirely through 8 or through 7 and 8 at the same time. The lower end of the inserted body 2 has its position in the zone between 800 and 1,000° C. If, therefore, the whole furnace gas is discharged through tube 8 all the gas discharged from the furnace will be removed from contact with the charge at a temperature between 800 and 1,000° C. and will have the composition as calculated in Example I above. If all the gas is discharged through the pipe 7 it has to pass the entire column of the charge and will leave the charge at the top of the furnace as usual and the gas will have the composition as calculated in Example II above. By special adjustment of the valves inserted in the discharge tubes 7 and 8, any gas mixture between the two extremes mentioned above can be withdrawn from the furnace.

By the new process it is therefore possible to produce with great economy and without any considerable change of the equipment in the iron blast furnace or in the copper or lead smelter a furnace gas which consists mainly in hydrogen and carbon monoxide and is poor in nitrogen, suitable for synthetic purposes.

The expression "blast gas" as used herein, means any air or gas introduced into the furnace to increase the rate of combustion of any fuel therein and to provide the necessary elements for combustion and reduction of the ores with the assistance of the fuel and fluxes.

Having thus described the invention, what is claimed as new and desired to be secured by Letters Patent is:

1. A process for producing furnace gases poor in nitrogen and suitable for synthetic purposes and consisting principally of hydrogen and carbon monoxide, comprising employing substantially nitrogen-free oxygen together with inflammable hydrocarbon gases poor in nitrogen as a blast gas in metallurgical reduction processes carried out in furnaces requiring the use of a blast.

2. A process for producing furnace gases poor in nitrogen and suitable for synthetic purposes and consisting principally of hydrogen and carbon monoxide, comprising using substantially nitrogen-free oxygen together with coke-oven gas as a blast gas in metallurgical reduction processes carried out in furnaces requiring the use of a blast.

3. A process for producing furnace gases poor in nitrogen and suitable for synthetic purposes and consisting principally of hydrogen and carbon monoxide, comprising employing oxygen together with coke-oven gas as a blast gas in the iron blast furnace, and discharging at least a part of the furnace gas from the lower part of the shaft at a temperature ranging between 700° and 1,000° C.

4. A process for producing furnace gases poor in nitrogen and suitable for synthetic purposes and consisting principally of hydrogen and carbon monoxide, comprising employing oxygen together with coke-oven gas as a blast in the iron blast furnace, together with steam to increase the hydrogen content of the oven gas so produced.

5. A process for producing furnace gases poor in nitrogen and suitable for synthetic purposes and consisting principally of hydrogen and carbon monoxide, comprising using substantially nitrogen-free oxygen together with natural gas as a blast gas in metallurgical reduction processes carried out in furnaces requiring the use of a blast.

FRITZ HANSGIRG.